UNITED STATES PATENT OFFICE.

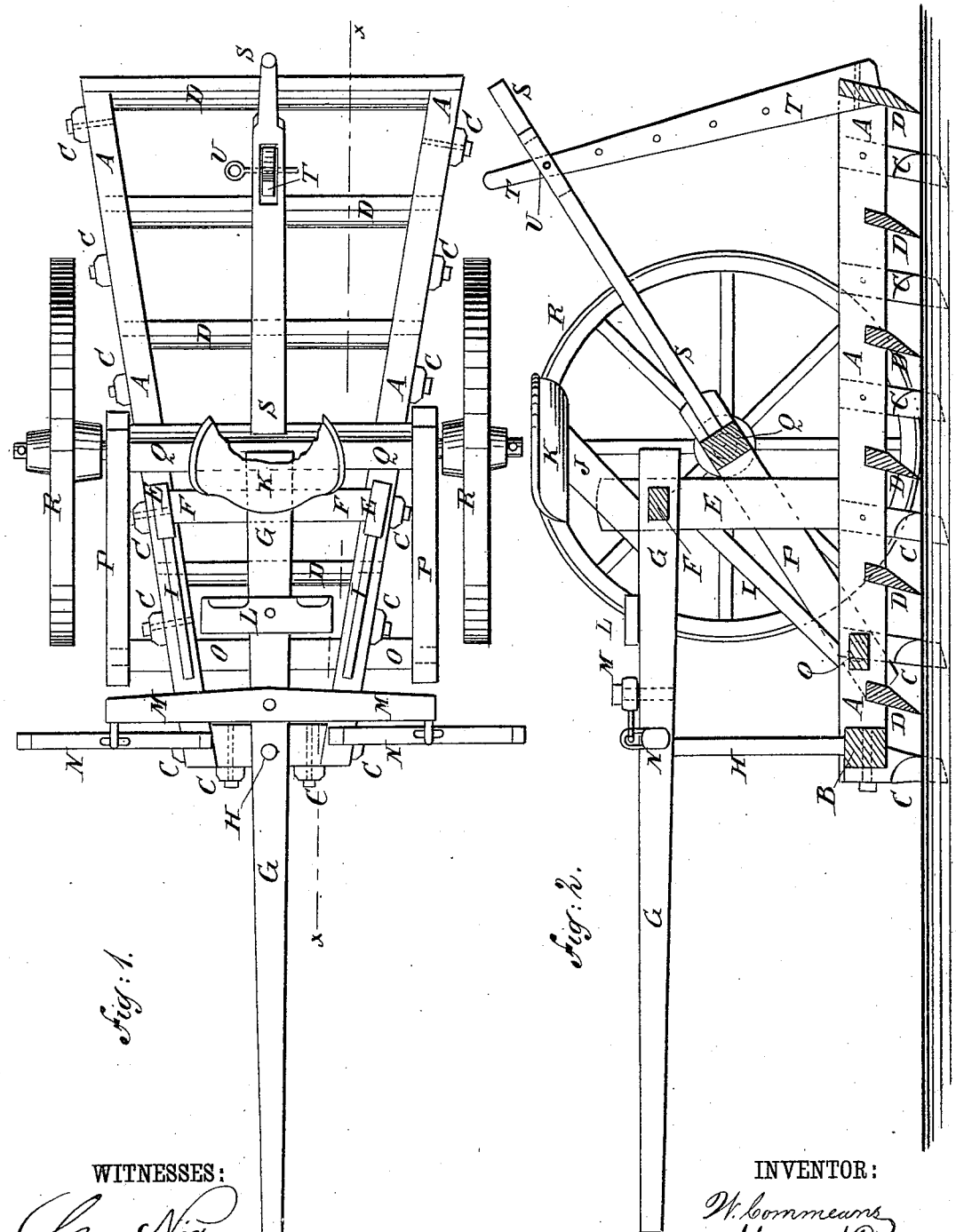

WILLIAM COMMEANS, OF LILLY CHAPEL, OHIO.

COMBINED PULVERIZER AND GRADER.

SPECIFICATION forming part of Letters Patent No. 284,946, dated September 11, 1883.

Application filed June 26, 1883. (No model.)

*To all whom it may concern:*

Be it known that I, WILLIAM COMMEANS, of Lilly Chapel, in the county of Madison and State of Ohio, have invented a new and useful Improvement in Combined Pulverizer and Grader, of which the following is a full, clear, and exact description.

Reference is to be had to the accompanying drawings, forming a part of this specification, in which similar letters of reference indicate corresponding parts in both the figures.

Figure 1 is a plan view of my improvement, part being broken away. Fig. 2 is a sectional side elevation of the same, taken through the line $x$ $x$, Fig. 1.

The object of this invention is to provide a convenient and effective means for pulverizing and leveling land.

The invention consists in a combined pulverizer and grader constructed with a tapered frame provided with teeth and scrapers, connected with the tongue by standards, a cross-bar and braces, and with the wheels and axle by a cross-bar, pivoted bars, and a lever and standard, whereby the machine can be adjusted to cause the teeth and scrapers to work at any desired depth in the soil, and to raise them above the ground, as will be hereinafter fully described.

A are the side bars of the machine, which incline toward each other toward their forward ends, and are connected at their forward ends by a short cross-bar, B.

To the outer sides of the side bars, A, and front bar, B, are bolted or otherwise attached teeth C, which are so arranged as to pulverize the whole surface of the ground over which the machine passes, and are so formed as to throw clods beneath the machine.

To the side bars, A, are secured the ends of cross-plates D, which are nearly vertical, their lower edges being slightly inclined forward. The lower parts of the plates D project below the lower sides of the bars A B, and are beveled upon the rear sides, as shown in Fig. 2, to adapt them to serve as knives or scrapers for pulverizing clods and leveling the surface of the ground.

To the side bars, A, a little in front of their centers, are rigidly attached the lower ends of two standards, E, to the upper ends of which are attached the ends of a cross bar, F.

To the center of the cross-bar F is attached the rear part of the tongue G, which is strengthened in position by the standard H, the upper end of which is attached to the said tongue, and its lower end is attached to the cross-bar B.

The standards E are strengthened against the draft-strain by the inclined braces I, the upper ends of which are attached to the upper parts of the said standards E, and their lower ends are attached to the forward parts of the side bars, A.

To the rear part of the tongue G is attached the lower end of a rearwardly-inclined standard, J, to the upper end of which is attached the driver's seat K. To the tongue G, a little in front of the standard J, is attached the center of a cross-bar, L, the ends of which project far enough to adapt them to serve as rests for the driver's feet.

To the tongue G, over the forward part of the grader, is pivoted the double-tree M, which is provided with single-trees N, in the ordinary manner.

To the side bars A, at a little distance from their forward ends, is attached a cross-bar, O, the ends of which project, and to them are pivoted the forward ends of two bars, P, the rear ends of which are rigidly attached to the axle Q of the wheel R.

To the center of the axle Q is rigidly attached the forward end of the rearwardly-projecting lever S, the rear part of which is slotted to receive the standard T, attached to the center of the rear scraper, D. The slotted part of the lever S is perforated to receive the pin U, which passes through it and through the standard T. Several holes are formed in the standard T to receive the pin U, so that by adjusting the lever S upon the standard T the machine can be adjusted to cause the teeth C to work at any desired depth in the ground, and to raise the said teeth above the ground for convenience in passing from place to place.

I do not abandon or dedicate to the public any patentable features set forth herein and not hereinafter claimed, but reserve the right to claim the same either in a reissue of any patent that may be granted upon this application, or in other applications for Letters Patent that I may make.

Having thus fully described my invention,

I claim as new and desire to secure by Letters Patent—

1. A combined pulverizer and grader, constructed substantially as herein shown and described, and consisting of the tapered frame A B, provided with the teeth C and scrapers D, the tongue G and its supporting-bars E F H I, the wheels and axle R Q and their connecting-bars P O, and the adjusting-lever and its standard, as set forth.

2. In a pulverizer and grader, the combination, with the tapered frame A B, of the teeth C and the series of scrapers D, substantially as herein shown and described, whereby the soil will be loosened, the clods will be broken in pieces, and the ground leveled, as set forth.

3. In a pulverizer and grader, the combination, with the frame A B, having teeth and scrapers, and the tongue G, of the standards E H, the cross-bar F, and the braces I, substantially as herein shown and described, whereby the said tongue and frame are firmly connected, as set forth.

4. In a pulverizer and grader, the combination, with the frame A B, having teeth C and scrapers D, of the cross-bar O, the pivoted bars P, the axle Q, and the wheels R, substantially as herein shown and described, whereby the said frame and its teeth and scrapers will be free to move up and down, as set forth.

5. In a pulverizer and grader, the combination, with the wheels and axle R Q and the frame and its teeth and scrapers A B C D, of the lever S and standard T, substantially as herein shown and described, whereby the machine can be adjusted to cause the said teeth and scrapers to work at any desired depth in the ground and to raise them above the ground, as set forth.

WILLIAM COMMEANS.

Witnesses:
   H. L. DILTZ,
   JOHN L. REEDER.